(12) United States Patent
Niu et al.

(10) Patent No.: US 12,014,057 B2
(45) Date of Patent: Jun. 18, 2024

(54) DATA PROCESSING SYSTEM

(71) Applicant: ALIBABA (CHINA) CO., LTD., Zhejiang Province (CN)

(72) Inventors: Dimin Niu, San Mateo, CA (US); Tianchan Guan, Shanghai (CN); Yijin Guan, Beijing (CN); Shuangchen Li, Sunnyvale, CA (US); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 30 days.

(21) Appl. No.: 18/064,919

(22) Filed: Dec. 12, 2022

(65) Prior Publication Data
US 2024/0094922 A1    Mar. 21, 2024

(30) Foreign Application Priority Data
Sep. 20, 2022   (CN) .......................... 202211141281.3

(51) Int. Cl.
*G06F 3/00*     (2006.01)
*G06F 3/06*     (2006.01)

(52) U.S. Cl.
CPC .......... *G06F 3/0619* (2013.01); *G06F 3/0629* (2013.01); *G06F 3/0683* (2013.01)

(58) Field of Classification Search
None
See application file for complete search history.

(56) References Cited

U.S. PATENT DOCUMENTS

2018/0270102 A1\* 9/2018 Avci .................... H04L 43/0823

\* cited by examiner

*Primary Examiner* — Midys Rojas
(74) *Attorney, Agent, or Firm* — WPAT, P.C.; Anthony King

(57) ABSTRACT

A data processing system includes a first server and a second server. The first server includes a first processor group, a first memory space and a first interface circuit. The second server includes a second processor group, a second memory space and a second interface circuit. The first memory space and the second memory space are allocated to the first processor group. The first processor group is configured to perform memory error detection to generate an error log corresponding to a memory error. When the memory error occurs in the second memory space, the first interface circuit is configured to send the error log to the second interface circuit, and the second processor group is configured to log the memory error according to the error log received by the second interface circuit. The data processing system is capable of realizing memory reliability architecture supporting operations across different servers.

20 Claims, 5 Drawing Sheets

DATA PROCESSING SYSTEM

PRIORITY CLAIM AND CROSS-REFERENCE

The present application claims priority to Chinese Patent Application No. 202211141281.3, filed on Sep. 20, 2022, which is incorporated by reference herein in its entirety.

BACKGROUND

The present disclosure relates to data processing and, more particularly, to a data processing system supporting reliability, availability and serviceability (RAS) architecture of a pooled memory.

With the development of information technology, such as big data technology and internet technology, a data center for processing huge volumes of data can play a vital role in an organization. The data center usually has numerous servers and storage spaces. However, different servers may have different storage occupancy rates, resulting in a waste of resources. For example, one server may use only half of its storage capacity, while another server needs more storage space than the amount of storage capacity thereof. For one thing, the situation described above will leave part of storage space unused; for another, the situation described above will degrade performance of a server which needs more storage space.

SUMMARY

The described embodiments provide a data processing system supporting reliability, availability and serviceability (RAS) architecture of a pooled memory.

Some embodiments described herein may include a data processing system. The data processing system includes a first server and a second server. The first server includes a first processor group, a first memory space and a first interface circuit. The second server includes a second processor group, a second memory space and a second interface circuit. The first memory space and the second memory space are allocated to the first processor group of the first server. The first processor group is configured to perform memory error detection to generate an error log corresponding to a memory error. When the memory error occurs in the second memory space of the second server, the first interface circuit is configured to send the error log to the second interface circuit, and the second processor group is configured to log the memory error according to the error log received by the second interface circuit.

Some embodiments described herein may include a data processing system. The data processing system includes a first server and a second server. The first server includes a first processor group, a first memory space and a first interface circuit. The second server includes a second processor group, a second memory space and a second interface circuit. The first memory space and the second memory space are allocated to the first processor group of the first server. The second processor group is configured to perform memory error detection to generate a first error log corresponding to a memory error. When the memory error occurs in the second memory space, the second interface circuit is configured to send the first error log to the first interface circuit, and the first processor group is configured to determine an error handling method for the memory error according to the first error log received by the first interface circuit.

Some embodiments described herein may include a data processing system. The data processing system includes a first server, a second server and an interconnection circuit. The first server includes a first processor group, a first memory space and a first interface circuit. The first interface circuit is configured to store a memory error log sent by the first processor group. The second server includes a second processor group, a second memory space and a second interface circuit. The second interface circuit is configured to store a memory error log sent by the second processor group. The first memory space and the second memory space are allocated to the first processor group of the first server. One of the first interface circuit and the second interface circuit is configured to send the corresponding memory log to the other of the first interface circuit and the second interface circuit through the interconnection circuit.

With the use of the proposed data processing system, servers located on the local side (e.g. located in the same rack) not only can have a low cost high performance shared memory pool, but also can realize memory RAS architecture which supports cross-server/machine operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
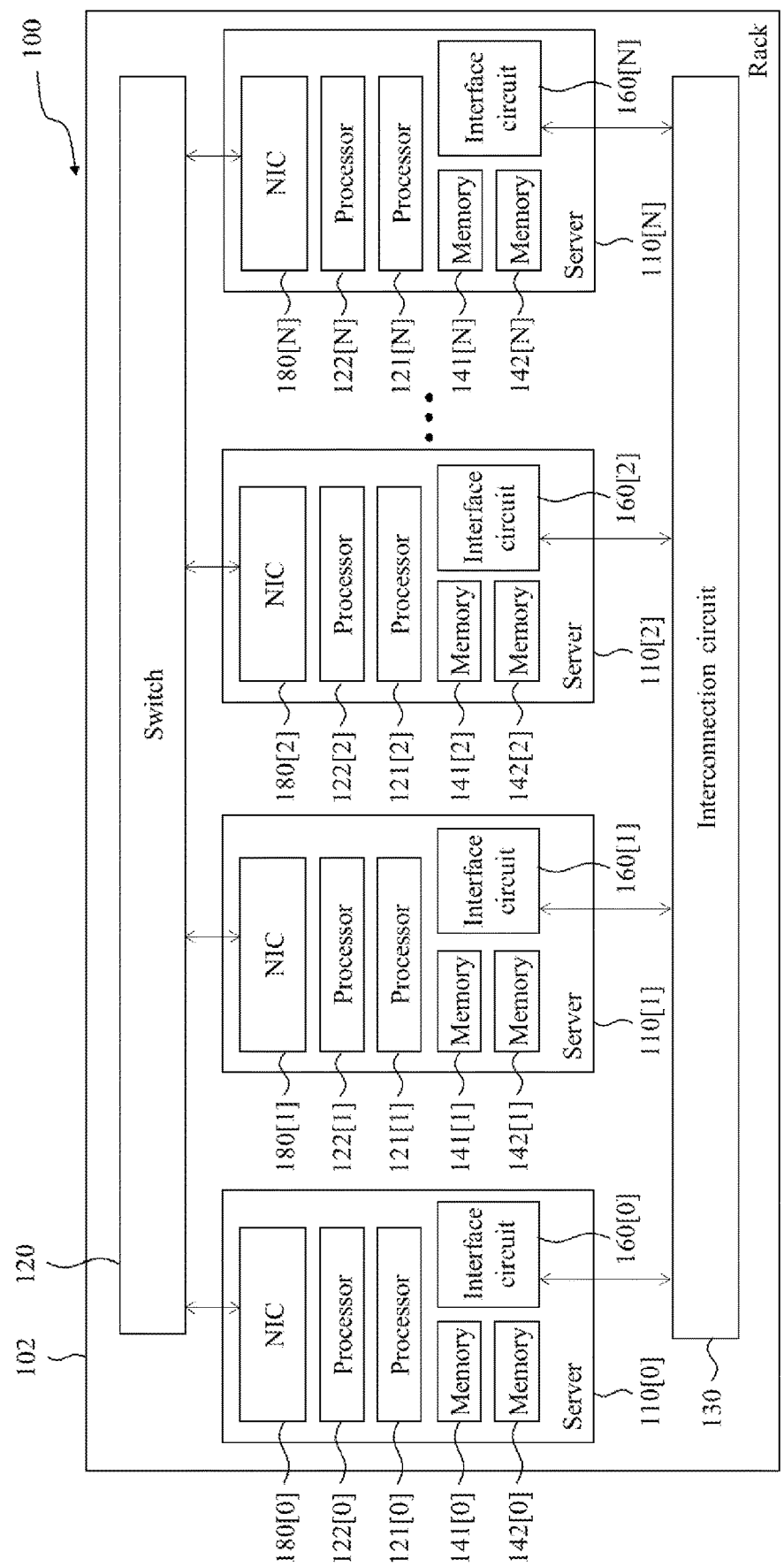
FIG. 1 is a block diagram illustrating an exemplary data processing system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

To reduce a waste of resources, memories of servers in a data center can be pooled to provide a memory pool shared by the servers. For example, local servers disposed in the same rack can access a remote memory pool located in another rack with the use of an access layer switch and a network protocol, such as an Ethernet protocol. However, such approach not only needs additional memory, but also increase the rack cost. In addition, as Ethernet exhibits a longer latency, quality of service (QoS) depends quite a lot on network performance. Furthermore, when a remote machine for providing a remote memory pool fails or operates abnormally, each server related to the remote machine will be affected. In other words, such approach has a larger blast radius.

Moreover, one method of providing more storage space for a server/machine is to connect the server to an external memory to thereby increase an available storage space. However, the relatively high cost of the memory would greatly increase the overall production costs. Further, as servers cannot share their memories with each other, a waste of resource is still an unsolved problem.

The present disclosure provides exemplary data processing systems, each of which can manage respective memories of servers located on the same local side to thereby realize pooled host memory architecture and increase the memory usage. The exemplary data processing system can expand available storage capacity of a server without the use of an external memory. In addition, the exemplary data processing system can realize a pooled memory scheme on a local side, thus having a shorter network latency and a smaller blast radius. Note that, in the proposed data processing system, servers located on the same local side can send each other memory error logs through respective interface circuits, thereby realizing memory reliability, availability and serviceability (RAS) architecture which supports cross-machine operation. Further description is provided below.

FIG. 1 is a block diagram illustrating an exemplary data processing system in accordance with some embodiments of the present disclosure. The data processing system 100 may be at least a portion of a data center (not shown in FIG. 1). The data processing system 100 includes, but is not limited to a plurality of servers 110[0]-110[N], a switch 120 (e.g. a top-of-rack (ToR) switch) and an interconnection circuit 130, where N is a positive integer. In the present embodiment, the servers 110[0]-110[N], the switch 120 and the interconnection circuit 130 can be located in the same rack/chassis 102. By way of example but not limitation, each server can be implemented as a rack server, a blade server or other types of servers.

The servers 110[0]-110[N] located in the same rack 102 can be regarded as servers located on the host side or the local side. Each server may include, but is not limited to, at least one processor, at least one memory, an interface circuit and a network interface controller (NIC). For example, the server 110[0] may include processors 121[0] and 122[0], memories 141[0] and 142[0], an interface circuit 160[0] and a network interface controller 180[0]. The server 110[1] may include processors 121[1] and 122[1], memories 141[1] and 142[1], an interface circuit 160[1] and a network interface controller 180[1], and so on. For illustrative purposes, some implementations of a server are provided below with reference to the server 110[0]. Those skilled in the art should appreciate that other servers can be implemented in a same or similar manner.

The processors 121[0]/122[0] can be implemented using a central processing unit (CPU), a graphics processing unit (GPU) or other types of processors. The memory 141[0]/142[0] is coupled to the processors 121[0] and 122[0]. The memory 141[0]/142[0] can be implemented using a memory capable of realizing error checking and correction.

The interface circuit 160[0], coupled to the processors 121[0] and 122[0], is configured to provide an interface such that the memory 141[0]/142[0] and memories of other servers can be interconnected to thereby realize a memory pool. The interface circuit 160[0] may be referred to as a smart memory extension (SMX) card. In the present embodiment, the interface circuit 160[0] may be implemented using, but is not limited to, a system on chip (SoC) or a Field Programmable Gate Array (FPGA).

The network interface controller 180[0], coupled to the processors 121[0] and 122[0], is configured to allow the server 110[0] to be connected to other servers in a wired or wireless manner. For example, the server 110[0] can be coupled to a server on a remote side through the network interface controller 180[0] and the switch 120.

In addition, the servers 110[0]-110[N] can be interconnected with each other through the external interconnection circuit 130. Thus, the memories 141[0]-141[N] and 142[0]-142[N] disposed in the same rack 102 can form a memory pool, which realizes a pooled host memory. In other words, servers on the local side can share memory spaces with each other. One server can utilize an unused memory space of other servers. In the present embodiment, the interconnection circuit 130 is configured to interconnect respective interface circuits of the servers 110[0]-110[N]. For example, the interconnection circuit 130 can realize a point-to-point interconnect between the interface circuits 160[0]-160[N]. As another example, the interconnection circuit 130 can be implemented using a switch circuit or a switch, thereby realizing an interconnect between the interface circuits 160[0]-160[N].

In the present embodiment, each of the interface circuits 160[0]-160[N] can be connected to interconnection circuit 130 according to a Compute Express Link (CXL) protocol. As the CXL protocol supports memory coherency, the servers 110[0]-110[N] can have a flexible memory sharing configuration. However, this is not intended to limit the scope of the present disclosure. In some embodiments, the interface circuits 160[0]-160[N] can be connected to interconnection circuit 130 according to other high-speed protocols or memory coherency protocols.

Note that a pooled host memory scheme realized by the data processing system 100 can finish calculation and storage operation one the local side without an additional memory of a remote server. Thus, the pooled host memory scheme not only can have a relatively low manufacturing cost, but also can have a relatively short network latency and a relatively small blast radius. In addition, servers located on a local side can send each other memory error logs through respective interface circuits, thereby realizing memory RAS architecture which supports cross-machine operation.

Consider an example where the servers 110[0] and 110[1] are configured to perform cross-machine operation. The interface circuit 160[0] may store a memory error log sent by a processor in the server 110[0], and the interface circuit 160[1] may store a memory error log sent by a processor in the server 110[1]. One of the interface circuits 160[0] and 160[1] can send the corresponding memory error log to the other of the interface circuits 160[0] and 160[1] through the interconnection circuit 130. For example, in some cases where at least a portion of memory spaces of the server 110[1] (e.g. at least a portion of memory spaces of the memory 141[1]) is allocated to the server 110[0], the server 110[1] can perform error detection upon a memory disposed in the server 110[1]. The interface circuit 160[0] of the server 110[0] can send a result/log of error detection to the server 110[1]. Thus, a processor of the server 110[1] can obtain associated information. In other words, memory RAS architecture which supports cross-machine operation can be realized with the interface circuit of each server.

Figure 2:
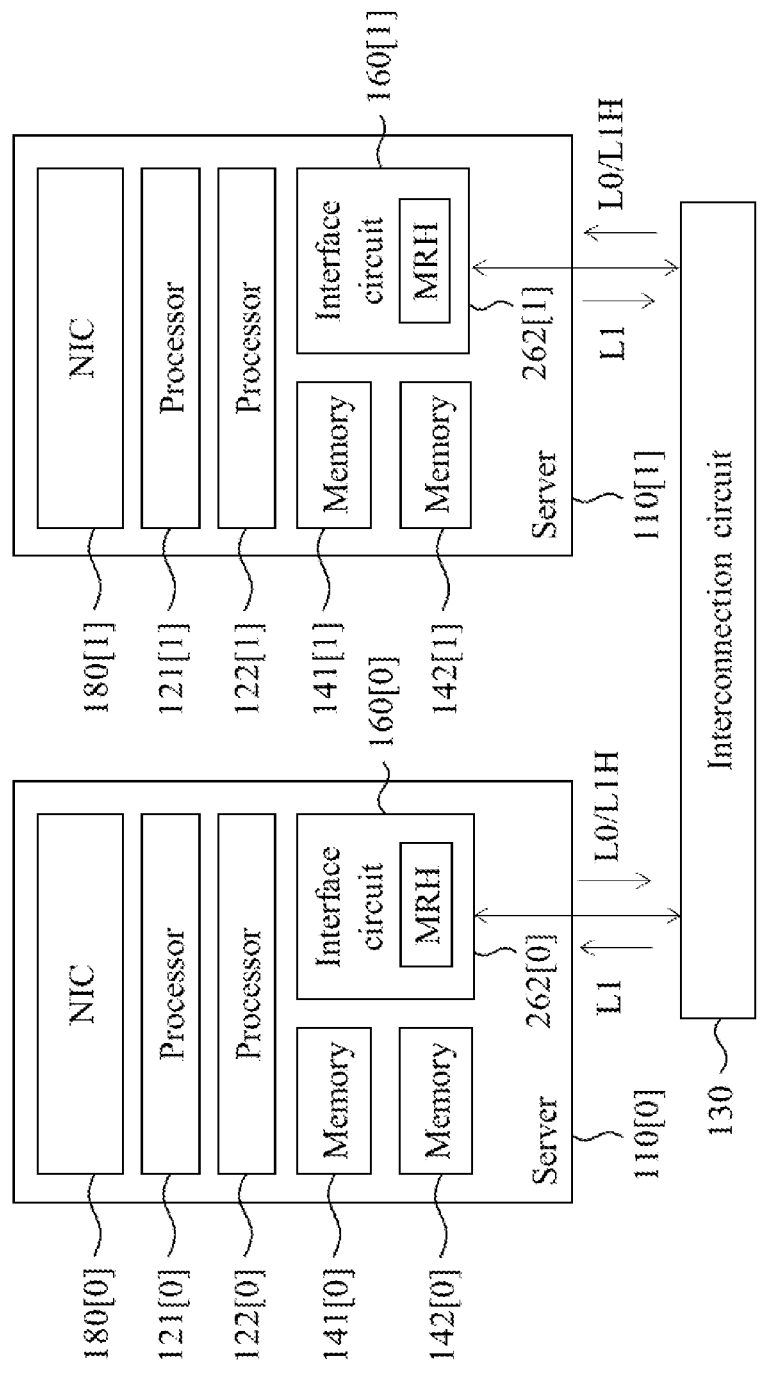
FIG. 2 is an implementation of cross-machine operation associated with the servers shown in FIG. 1 in accordance with some embodiments of the present disclosure.

FIG. 2 is an implementation of cross-machine operation associated with the servers 110[0] and 110[1] shown in FIG. 1 in accordance with some embodiments of the present disclosure. Although memory RAS architecture supporting cross-machine operation is described with reference to the servers 110[0] and 110[1] shown in FIG. 1, those skilled in the art can appreciate that memory RAS architecture supporting cross-machine operation can be implemented using any two servers shown in FIG. 1 without departing from the scope of the present disclosure. For example, the server 110[1] shown in FIG. 2 may be replaced with any one of the servers 110[2]-110[N] shown in FIG. 1.

In the present embodiment, the interface circuit 160[0] includes a memory RAS handler module ((hereafter referred to as an MRH module) 262[0], and the interface circuit 160[1] includes an MRH module 262[1]. The MRH module 262[0] may receive memory RAS information coming from the server 110[0], such as information on error checking and correction (ECC). The MRH module 262[0] may send the received memory RAS information to the MRH module 262[1] included in the interface circuit 160[1]. Similarly, the MRH module 262[1] may receive memory RAS information coming from the server 110[1], such as information on error checking and correction (ECC), and send the received memory RAS information to the MRH module 262[0] included in the interface circuit 160[0]. The memory RAS architecture supporting cross-machine operation can be realized with the memory RAS information transmitted between different machines/servers.

To facilitate an understanding of the present disclosure, some embodiments are given below for further description of the proposed memory RAS architecture supporting cross-server operation. However, this is provided for illustrative purposes, and is not intended to limit the scope of the present disclosure. As long as a server includes an interface circuit, configured for sending/transmitting memory error log(s), to interact with a local server to thereby realize memory RAS features, associated modifications and alternatives fall within the scope of the present disclosure.

Figure 3:
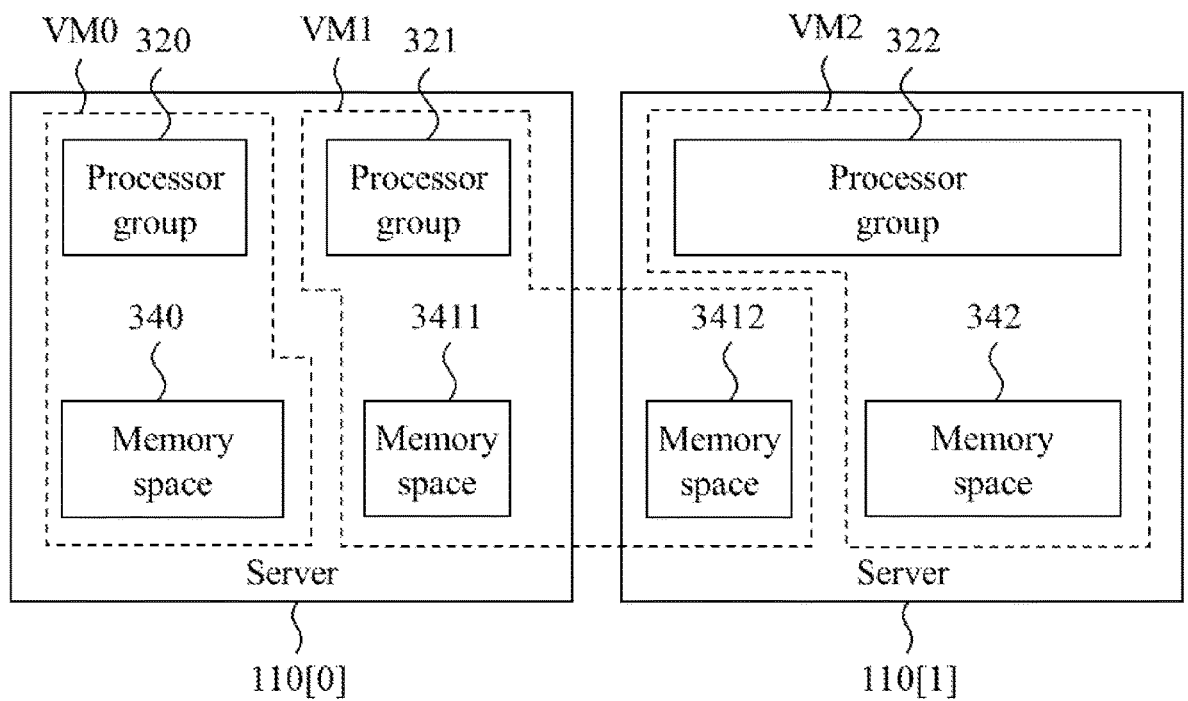
FIG. 3 is a diagram illustrating virtual machines implemented using the servers shown in FIG. 2 in accordance with some embodiments of the present disclosure.

FIG. 3 is a diagram illustrating virtual machines implemented using the servers 110[0] and 110[1] shown in FIG. 2 in accordance with some embodiments of the present disclosure. In the present embodiment, the virtual machine VM0 can be implemented using a processor group and a part of the memory space of the server 110[0]; the virtual machine VM1 can be implemented using another processor group and another part of the memory space of the server 110[0], and a part of the memory space of the server 110[1]; the virtual machine VM2 can be implemented using a processor group and a part of the memory space of the server 110[1]. In other words, a part of the memory space of the server 110[1] is allocated to the server 110[0].

Referring to FIG. 3 and also to FIG. 2, for example, the memory space 340 may be allocated to the processor group 320 to implement the virtual machine VM0. The processor group 320 may be implemented using but not limited to the processor 121[0]. The memory space 340 may be implemented using a part of storage spaces of the memories 141[0] and 142[0]. The memory space 3411 and the memory space 3412 can be allocated to the processor group 321 to implement the virtual machine VM1. The processor group 321 may be implemented using but not limited to the processor 122[0]. The memory space 3411 may be implemented using another part of the storage spaces of the memories 141[0] and 142[0], and the memory space 3412 may be implemented using a part of storage spaces of the memories 141[1] and 142[1]. In addition, the memory space 342 can be allocated to the processor group 322 to implement the virtual machine VM2. The processor group 322 may be implemented using but not limited to the processors 121[1] and 122[1]. The memory space 342 may be implemented using another part of the storage spaces of the memories 141[1] and 142[1]. An operating system (OS), hypervisor or virtual machine monitor (VMM) can be used to run the virtual machine VM0/VM1/VM2. In the present embodiment, the virtual machine VM1 can run on different servers 110[0] and 110[1] to effectively use the memory space. The servers 110[0] and 110[1] can realize the memory RAS architecture with the use of the interface circuits 160[0] and 160[1].

Figure 4:
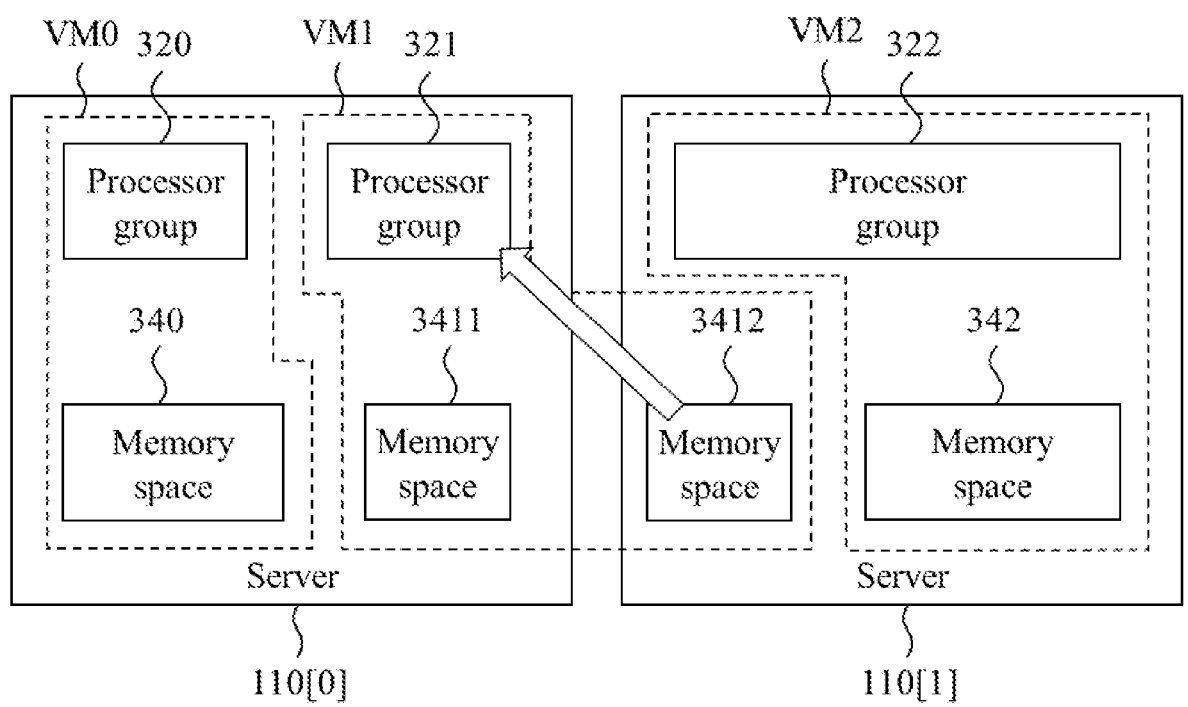
FIG. 4 is a diagram illustrating an operating scenario in which the servers shown in FIG. 3 are involved in memory detection in accordance with some embodiments of the present disclosure.

FIG. 4 is a diagram illustrating an operating scenario in which the servers 110[0] and 110[1] shown in FIG. 3 are involved in memory detection in accordance with some embodiments of the present disclosure. Referring to FIG. 4 and also to FIG. 2, the processor group 321 can perform memory error detection to generate an error log L0 corresponding to a memory error. The error log L0 includes, but is not limited to, a memory address corresponding to the memory error, a type of the memory error (e.g. a correctable or uncorrectable error), and/or an error handling method for the memory error. For example, the processor group 321 can read the memory space 3411 to perform the memory error detection upon the memory space 3411. As another example, the processor group 321 can read the memory space 3412 of the server 110[1] through the interface circuit 160[0], thereby preforming the memory error detection upon the memory space 3412. In addition, when the memory error detected by the processor group 321 occurs in the memory space 3412 of the server 110[1], the interface circuit 160[0] can be configured to send the error log L0 to the interface circuit 160[1] located in the server 110[1]. According to the error log L0 received by the interface circuit 160[1], the processor group 322 can log the memory error detected by the processor group 321. In other words, the interface circuits 160[0] and 160[1] can be used to maintain the memory reliability during cross-server operation.

For example, the interface circuit 160[0] can be configured to perform memory addressing according to a memory address indicated by the error log L0, and accordingly determine if the memory error corresponding to the error log L0 occurs in the memory space 3412. Furthermore, in some cases where the memory error corresponding to the error log L0 occurs at a storage location in the memory space 3412, and the error log L0 indicates a first memory address corresponding to the storage location in the server 110[0], the interface circuit 160[1] can be configured to translate the first memory address to a second memory address corresponding to the storage location in the server 110[1]. The processor group 322 can be configured to log the memory error corresponding to the error log L0 according to the second memory address.

In the present embodiment, each of the memories 141[0], 142[0], 141[1] and 142[1] can be implemented using a memory supporting error checking and correction. The processor group 321, or a memory controller included therein, can perform memory error detection by reading the memory spaces 3411 and 3412. In addition, the processor group 321 can be configured to determine if the memory address indicated by the error log L0 is within an address range of the memory space 3412 in the server 110[0], and accordingly selectively send the error log L0 to the interface circuit 160[0]. When it is determined that the memory address indicated by the error log L0 is within the address range, the processor group 321 is configured to send the error log L0 to the interface circuit 160[0]. In other words, when the error log L0 involves memory RAS information of the cross-machine operation, the processor group 321 can send the error log L0 to the interface circuit 160[0].

In operation, the processor group 321, or a memory controller included therein, can read the memory space 3412 through the interface circuit 160[0], the interconnection circuit 130 and the interface circuit 160[1]. When a memory error is detected, the processor group 321 can log this memory error. For example, when the memory error detected by the processor group 321 is a correctable error, the detected memory error can be logged in a machine check architecture (MCA) register of the processor group 321. The error log L0 includes a memory address corresponding to the memory error, and can be stored in the MCA register. When the operating system used for running the virtual machine VM1 controls the processor group 321 to poll the MCA register, the kernel of the operating system (or the processor group 321) can determine if the memory address indicated by the error log L0 is within a remote memory address range managed by the server 110[0] (i.e. an address range outside a physical address range corresponding to the memory space of the server 110[0]). When it is determined that the memory address indicated by the error log L0 is within the remote memory address range managed by the server 110[0], the kernel of the operating system (or the processor group 321) can send the error log L0 to the MRH module 262[0] of the interface circuit 160[0].

Next, the interface circuit 160[0] can perform memory addressing according to the memory address indicated by the error log L0, and accordingly determine which server the corresponding memory error occurs in. The interface circuit 160[0] can send the error log L0 to the interface circuit of the server in which the memory error occurs. In the present embodiment, the interface circuit 160[0] may determine that the memory error corresponding to the error log L0 occurs in the memory space 3412, and send the error log L0 to the MRH module 262[1] of the interface circuit 160[1] through the interconnection circuit 130. The MRH module 262[1] can translate the memory address (or a physical address) indicated by the error log L0 to a memory address (or a physical address) corresponding to the detected memory error in the server 110[1]. In addition, the MRH module 262[1] can notify the processor group 322 (or the operating system used to run the virtual machine VM2) that the memory error can be logged in the MCA register of the processor group 322.

In some embodiments, the memory error detected by the processor group 321 may be an uncorrectable error, such as data containing multiple error bits. The error log L0 received by the interface circuit 160[1] may include an error handling method/mechanism for the memory error. The processor group 322 can handle the memory error according to the error log L0. For example, the processor group 321 can be configured to determine if the detected memory error is correctable. When it is determined that the memory error is uncorrectable, the processor group 321 can be configured to evaluate the memory error to determine the error handling method for the memory error.

In operation, when the memory error detected by the processor group 321 is an uncorrectable error, the operating system can control the processor group 321 to execute machine check exception (MCE) handler, which can evaluate the effect of the uncorrectable error on the system to thereby determine an error handling method for the memory error. The error log L0 may include an error level of the memory error, or an error handling method for the memory error. For example, when the uncorrectable error is evaluated to be a critical error which is likely to corrupt the operating state of the processor group 321, the error handling method for the memory error may be restarting the system; when the uncorrectable error is evaluated to be an error that can be recovered by software, the error handling method for the memory error may be repairing the uncorrectable error by software during runtime; when the uncorrectable error is evaluated to be an error having little effect on the system, the error handling method for the memory error may be no action (i.e. handling the uncorrectable error may be not needed). Next, the kernel of the operating system (or the processor group 321) can determine that the memory address indicated by the error log L0 is within the remote memory address range managed by the server 110[0], thereby sending the error log L0 to the MRH module 262[0] of the interface circuit 160[0].

When it is determined that the memory error corresponding to the error log L0 occurs in the memory space 3412, the interface circuit 160[0] can send the error log L0 to the MRH module 262[1] of the interface circuit 160[1] through the interconnection circuit 130. The MRH module 262[1] can translate the memory address (or a physical address) indicated by the error log L0 to a memory address (or a physical address) corresponding to the detected memory error in the server 110[1]. In addition, the MRH module 262[1] can notify the processor group 322 (or the operating system used to run the virtual machine VM2) of logging the memory error. The processor group 322 can handle the memory error according to a memory error handling method indicated by error log L0.

Figure 5:
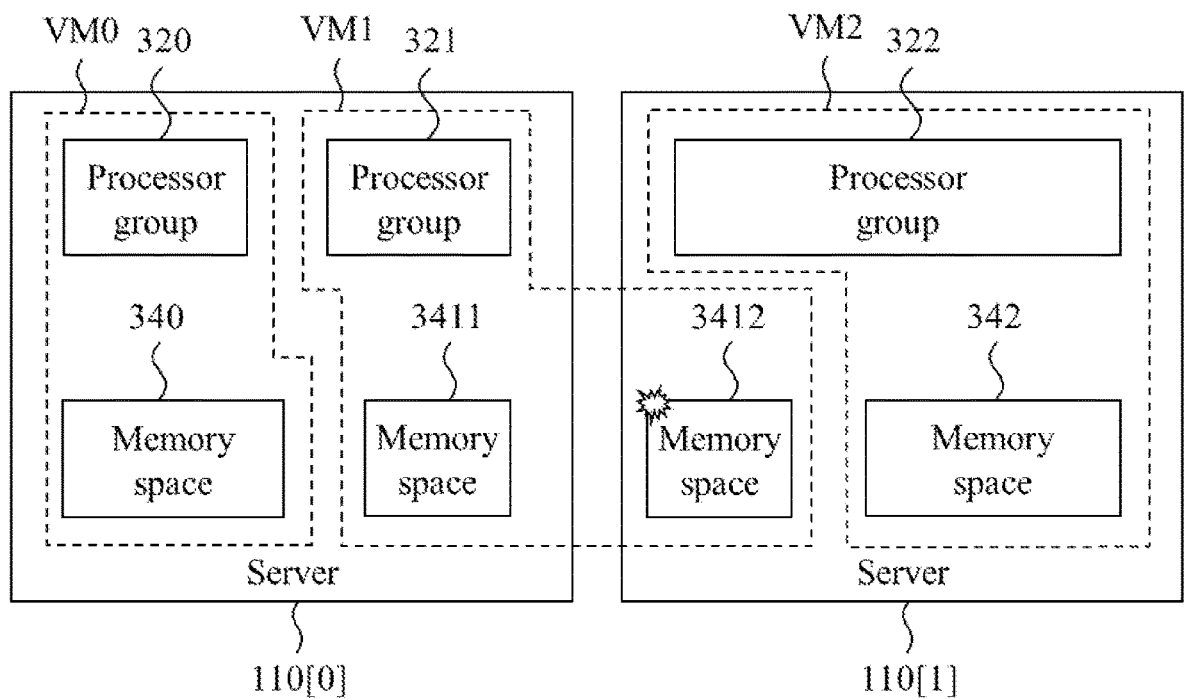
FIG. 5 is a diagram illustrating another operating scenario in which the servers shown in FIG. 3 are involved in memory detection in accordance with some embodiments of the present disclosure.

FIG. 5 is a diagram illustrating another operating scenario in which the servers 110[0] and 110[1] shown in FIG. 3 are involved in memory detection in accordance with some embodiments of the present disclosure. Referring to FIG. 5 and also to FIG. 2, the processor group 322 can perform memory error detection to generate an error log L1 corresponding to a memory error. The error log L1 includes, but is not limited to, a memory address corresponding to the memory error, a type of the memory error (e.g. a correctable or uncorrectable error), and/or an error handling method for the memory error. For example, the processor group 322 can read the memory space 3412/342 to perform the memory error detection upon the memory space 3412/342. As another example, the processor group 321 can perform memory scrubbing upon the memory space 3412 to perform the memory error detection. In addition, when the memory error detected by the processor group 322 occurs in the memory space 3412 of the server 110[1] (represented by a blast symbol), the interface circuit 160[1] can be configured to send the error log L1 to the interface circuit 160[0] located in the server 110[0]. According to the error log L1 received by the interface circuit 160[0], the processor group 321 can determine an error handling method/mechanism for the detected memory error. In other words, the interface circuits 160[0] and 160[1] can be used to maintain the memory reliability during cross-server operation.

In the present embodiment, the processor group 322 can be configured to determine if the memory address indicated by the error log L1 is within an address range of the memory space 3412 in the server 110[1], and accordingly selectively send the error log L1 to the interface circuit 160[1]. When it is determined that the memory address indicated by the error log L1 is within the address range, the processor group 322 is configured to send the error log L1 to the interface circuit 160[1]. In other words, when the error log L1 involves memory RAS information of the cross-machine operation, the processor group 322 can send the error log L1 to the interface circuit 160[1].

In operation, the processor group 322, or a memory controller included therein, can perform memory scrubbing to read storage locations in the server 110[0] to thereby correct possible bit error(s). When a memory error is detected, the processor group 322 can log this memory error and generate the error log L1. In some cases where the kernel of the operating system (or the processor group 322) determines that the memory address indicated by the error log L1 is within a memory address range managed by the server 110[0], the kernel of the operating system (or the processor group 322) can send the error log L1 to the interface circuit of the server in which the memory error occurs.

In the present embodiment, the interface circuit 160[1] may determine that the memory error corresponding to the error log L1 occurs in the memory space 3412, and send the error log L1 to the MRH module 262[0] of the interface circuit 160[0] through the interconnection circuit 130. The MRH module 262[0] can translate the memory address (or a physical address) indicated by the error log L1 to a memory address (or a physical address) corresponding to the detected memory error in the server 110[0]. In addition, the MRH module 262[0] can notify the processor group 321 (or the operating system used to run the virtual machine VM1) that the memory error can be logged in the MCA register of the processor group 321.

In some cases where the error log L1 indicates that memory error detected by the processor group 322 is an uncorrectable error (e.g. containing multiple error bits), the processor group 322 can be configured to evaluate the memory error according to the error log L1, and accordingly generate an error log L1H including an error handling method for the memory error. The operating system used to run the virtual machine VM1 can control the processor group 321 to execute MCE handler to evaluate the effect of the uncorrectable error on the system, and accordingly generate the error log L1H. The error log L1H may include an error level of the memory error, or an error handling method for the memory error. For example, when the uncorrectable error is evaluated to be a critical error which is likely to corrupt the operating state of the processor group 321, the error handling method for the memory error may be restarting the system; when the uncorrectable error is evaluated to be an error that can be recovered by software, the error handling method for the memory error may be repairing the uncorrectable error by software during runtime; when the uncorrectable error is evaluated to be an error having little effect on the system, the error handling method for the memory error may be no action (i.e. handling the uncorrectable error may be not needed). In addition, the processor group 321 can send the error log L1H to the interface circuit 160[1] through the interface circuit 160[0]. The processor group 322 can handle the detected memory error according to the memory error handling method indicated by the error log L1H.

With the use of the proposed data processing system, servers located on the local side (e.g. located in the same rack) not only can have a low cost high performance shared memory pool, but also can realize memory RAS architecture which supports cross-server/machine operation.

Note that the proposed memory management mechanism may be applied to servers located in different racks to thereby realize memory RAS architecture which supports cross-server/machine operation. For example, in some embodiments, the servers 110[0] and 110[1] shown in FIG. 2 may be located in different racks. The processor of one of the servers 110[0] and 110[1] may access the memory of the other server through respective interface circuits of the servers 110[0] and 110[1]. As long as a data processing system can utilize respective interface circuits of servers located in different racks to realize memory RAS architecture which supports cross-server/machine operation, associated modifications and alternatives fall within the scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A data processing system, comprising:
a first server, comprising a first processor group, a first memory space and a first interface circuit; and
a second server, comprising a second processor group, a second memory space and a second interface circuit, wherein the first memory space and the second memory space are allocated to the first processor group of the first server; the first processor group is configured to perform memory error detection to generate an error log corresponding to a memory error;
wherein when the memory error occurs in the second memory space of the second server, the first interface circuit is configured to send the error log to the second interface circuit, and the second processor group is configured to log the memory error according to the error log received by the second interface circuit.

2. The data processing system of claim 1, wherein the first interface circuit is configured to perform memory addressing according to a memory address indicated by the error log, and accordingly determine if the memory error occurs in the second memory space.

3. The data processing system of claim 1, wherein the memory error occurs at a storage location of the second memory space, and the error log indicates a first memory address corresponding to the storage location in the first server; the second interface circuit is configured to translate the first memory address to a second memory address corresponding to the storage location in the second server; the second processor group is configured to log the memory error according to the second memory address.

4. The data processing system of claim 1, wherein the memory error is an uncorrectable error, the error log received by the second interface circuit comprises an error handling method for the memory error, and the second processor group is configured to handle the memory error according to the error log.

5. The data processing system of claim 1, wherein the first processor group is configured to determine if the memory error is correctable; when it is determined that the memory error is uncorrectable, the first processor group is configured to evaluate the memory error to determine an error handling method for the memory error.

6. The data processing system of claim 1, wherein the first processor group is configured to read the second memory space through the first interface circuit, and perform the memory error detection upon the second memory space.

7. The data processing system of claim 1, wherein the first processor group is configured to determine if a memory address indicated by the error log is within an address range of the second memory space in the first server, and accordingly selectively send the error log to the first interface circuit; when it is determined that the memory address is within the address range, the first processor group is configured to send the error log to the first interface circuit.

8. The data processing system of claim 1, further comprising:
    an interconnection circuit, wherein the first interface circuit is connected to the second interface circuit through the interconnection circuit.

9. The data processing system of claim 8, wherein each of the first interface circuit and the second interface circuit is connected to the interconnection circuit according to a Compute Express Link protocol.

10. A data processing system, comprising:
    a first server, comprising a first processor group, a first memory space and a first interface circuit; and
    a second server, comprising a second processor group, a second memory space and a second interface circuit, wherein the first memory space and the second memory space are allocated to the first processor group of the first server; the second processor group is configured to perform memory error detection to generate a first error log corresponding to a memory error;
    wherein when the memory error occurs in the second memory space, the second interface circuit is configured to send the first error log to the first interface circuit, and the first processor group is configured to determine an error handling method for the memory error according to the first error log received by the first interface circuit.

11. The data processing system of claim 10, wherein the second interface circuit is configured to perform memory addressing according to a memory address indicated by the first error log, and accordingly determine if the memory error occurs in the second memory space.

12. The data processing system of claim 10, wherein the first error log indicates that the memory error is an uncorrectable error, and the first processor group is configured to evaluate the memory error according to the first error log, and accordingly generate a second error log comprising the error handling method for the memory error.

13. The data processing system of claim 12, wherein the second interface circuit is configured to receive the second error log, and the second processor group is configured to handle the memory error according to the second error log.

14. The data processing system of claim 10, wherein the second processor group is configured to perform the memory error detection by performing memory scrubbing upon the second memory space.

15. The data processing system of claim 10, wherein the second processor group is configured to determine if a memory address indicated by the first error log is within an address range of the second memory space in the second server, and accordingly selectively send the first error log to the second interface circuit; when it is determined that the memory address is within the address range, the second processor group is configured to send the first error log to the second interface circuit.

16. The data processing system of claim 10, further comprising:
    an interconnection circuit, wherein the second interface circuit is connected to the first interface circuit through the interconnection circuit.

17. The data processing system of claim 16, wherein each of the second interface circuit and the first interface circuit is connected to the interconnection circuit according to a Compute Express Link protocol.

18. A data processing system, comprising:
    a first server, comprising a first processor group, a first memory space and a first interface circuit, wherein the first interface circuit is configured to store a memory error log sent by the first processor group;
    a second server, comprising a second processor group, a second memory space and a second interface circuit, wherein the second interface circuit is configured to store a memory error log sent by the second processor group; the first memory space and the second memory space are allocated to the first processor group of the first server; and
    an interconnection circuit, wherein one of the first interface circuit and the second interface circuit is configured to send the corresponding memory log to the other of the first interface circuit and the second interface circuit through the interconnection circuit.

19. The data processing system of claim 18, wherein the first processor group is configured to perform memory error detection upon the second memory space by reading the second memory space through the first interface circuit, and generate the memory error log sent to the first interface circuit.

20. The data processing system of claim 18, wherein the second processor group is configured to perform memory error detection by performing memory scrubbing upon the second memory space, and generate the memory error log sent to the second interface circuit.

* * * * *